(12) United States Patent
Mayer et al.

(10) Patent No.: US 10,780,855 B2
(45) Date of Patent: Sep. 22, 2020

(54) METHOD FOR OPERATING A MOTORIZED TWO-WHEELED VEHICLE, IN PARTICULAR A MOTORCYCLE, AND COMPUTER PROGRAM FOR CARRYING OUT THE METHOD

(71) Applicant: Robert Bosch GmbH, Stuttgart (DE)

(72) Inventors: Florian Mayer, Ditzingen (DE); Jochen Wieland, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/533,882

(22) Filed: Aug. 7, 2019

(65) Prior Publication Data
US 2020/0055475 A1 Feb. 20, 2020

(30) Foreign Application Priority Data
Aug. 15, 2018 (DE) .......................... 10 2018 213 755

(51) Int. Cl.
| | |
|---|---|
| *B62J 27/00* | (2020.01) |
| *B62J 99/00* | (2020.01) |
| *H04W 4/90* | (2018.01) |
| *G01P 13/00* | (2006.01) |
| *B60R 21/013* | (2006.01) |

(Continued)

(52) U.S. Cl.
CPC ........ *B60R 21/013* (2013.01); *B60R 21/0132* (2013.01); *B62J 27/00* (2013.01); *B62J 99/00* (2013.01); *G01P 13/00* (2013.01); *H04W 4/90* (2018.02); *B60R 2021/0088* (2013.01); *B60R 2021/01313* (2013.01);

(Continued)

(58) Field of Classification Search
CPC ................ B60Q 9/008; B60Q 2300/41; B60Q 2300/112; G06K 9/00805; G06K 9/4604; G06K 9/00798; G08G 1/16; G08G 1/164; B60R 2021/0088; B60W 2550/10; B60W 50/14; B60W 2520/26; B60W 2720/26; B60W 30/02; B60W 30/08; B60W 2520/28; B60W 2540/10; B60W 2540/18; A41D 2600/102; B60T 2201/022; H04W 4/40

See application file for complete search history.

(56) References Cited

U.S. PATENT DOCUMENTS

| | | | |
|---|---|---|---|
| 2015/0232091 A1* | 8/2015 | Lich ......................... | B62J 27/00 701/41 |
| 2016/0098606 A1* | 4/2016 | Nakamura ......... | G06K 9/00805 382/103 |

(Continued)

FOREIGN PATENT DOCUMENTS

| | | |
|---|---|---|
| DE | 102012222965 A1 | 6/2014 |
| JP | 2010047081 A * | 3/2010 |
| JP | 2017065417 A * | 4/2017 |

*Primary Examiner* — Liton Miah
(74) *Attorney, Agent, or Firm* — Norton Rose Fulbright US LLP; Gerard Messina

(57) ABSTRACT

A method and computer program are provided for operating a motorized two-wheeled vehicle, in particular a motorcycle that includes a sensor system for accident recognition that generates measuring signals. The sensor system is used for recognizing a rotation of a front wheel of the two-wheeled vehicle that deviates from a normal steering movement and allows an inference concerning a collision of the two-wheeled vehicle with another object. Moreover, the invention relates to a computer program for carrying out the method.

26 Claims, 2 Drawing Sheets

(51) Int. Cl.
  *B60R 21/0132* (2006.01)
  *B60R 21/00* (2006.01)
  *B62J 45/10* (2020.01)
  *B62J 45/40* (2020.01)
(52) U.S. Cl.
  CPC ..... *B60R 2021/01327* (2013.01); *B62J 45/10* (2020.02); *B62J 45/40* (2020.02)

(56) References Cited

U.S. PATENT DOCUMENTS

2018/0030910 A1* 2/2018 Rocher .................... G01C 9/00
2019/0176689 A1* 6/2019 Santucci .................. B60Q 1/52
2019/0283722 A1* 9/2019 Haas .................. B60T 8/17551

* cited by examiner

METHOD FOR OPERATING A MOTORIZED TWO-WHEELED VEHICLE, IN PARTICULAR A MOTORCYCLE, AND COMPUTER PROGRAM FOR CARRYING OUT THE METHOD

CROSS-REFERENCE TO RELATED APPLICATIONS

The present application claims priority under 35 U.S.C. § 119 to DE 10 2018 213 755.2, filed in the Federal Republic of Germany on Aug. 15, 2018, the content of which is hereby incorporated by reference herein in its entirety.

FIELD OF THE INVENTION

The present invention relates to a method for operating a motorized two-wheeled vehicle, in particular a motorcycle. Moreover, the present invention relates to a computer program for carrying out the provided method.

BACKGROUND

Active and/or passive safety systems are becoming increasingly important in the area of motorized two-wheeled vehicles. Thus, methods for detecting accident and/or fall situations are already known from the related art. As an example, reference is made to Published Unexamined German Patent Application DE 10 2012 222 965 A1, which provides a method for hazard recognition in a two-wheeled vehicle, in which vehicle state variables of the two-wheeled vehicle are ascertained via a sensor system, and for the case that a hazard situation is deduced from the vehicle state variables, a signal for requesting or carrying out a safety measure is generated. The safety measure is used to avert the hazard situation if possible, but at least to alleviate the consequences of an accident for the rider, passenger, or a third party.

SUMMARY

An object of the present invention is to provide a method for operating a motorized two-wheeled vehicle, in particular a motorcycle, in which a sensor system is used for accident recognition, in particular for recognizing a collision of the motorized two-wheeled vehicle with another object, which can be another vehicle, some other object, and/or a person. The method is intended to contribute to increased safety when operating a motorized two-wheeled vehicle.

An example embodiment of the present invention is directed to a method for operating a motorized two-wheeled vehicle, in particular a motorcycle that includes a sensor system for accident recognition that generates measuring signals is provided, where the method includes using the sensor system for recognizing a rotation of a front wheel of the two-wheeled vehicle that deviates from a normal steering movement and allows an inference concerning a collision of the two-wheeled vehicle with another object.

If the motorized two-wheeled vehicle is moving forward and collides with another vehicle or some other object, the front wheel of the two-wheeled vehicle comes into contact first with the object involved in the collision. Due to the force of the impact, the impact angle, and/or the movement of the object involved in the collision, the front wheel of the two-wheeled vehicle is generally turned to the side. This process, referred to as "wheel flip," takes place quickly and abruptly, so that it can be easily distinguished from a normal steering movement.

If the motorized two-wheeled vehicle collides, for example, with another vehicle traveling crosswise, the front wheel of the two-wheeled vehicle is turned away to the side, corresponding to the transverse speed of the other vehicle. If the two-wheeled vehicle collides with a stationary object, for example a guardrail or some other roadway boundary, in this case the angled collision results in quick, abrupt rotation of the front wheel.

According to the present invention, this quick, abrupt rotational movement of the front wheel is detected using a sensor system that is present on the two-wheeled vehicle and utilized as an indication of a collision of the motorized two-wheeled vehicle. When a collision is recognized, this can be used as a trigger for further actions that can possibly be life-saving for the rider or other persons involved in the collision.

An acceleration of the front wheel in at least one spatial direction, e.g., in the longitudinal, transverse, and/or vertical direction(s), is preferably ascertained using the sensor system of the two-wheeled vehicle. The acceleration is advantageously ascertained in at least two spatial directions, preferably in the longitudinal and the transverse directions. This is because the "wheel flip" to be detected is generally accompanied by an abrupt change in the acceleration of the front wheel in the longitudinal direction and in the transverse direction. While the acceleration in the longitudinal direction, after initially high values, decreases once again during the temporal course of the wheel flip, it increases in the transverse direction.

In addition, the acceleration of the front wheel in the third spatial direction, which is preferably the vertical direction, can be ascertained using the sensor system. If the acceleration of the front wheel is known in all three spatial directions, the position of the front wheel in space can thus be determined. This additional information concerning the exact position in space can in turn provide better insight into the type and/or severity of the collision, and can thus be used as the basis for the decision as to whether specific safety measures are to be initiated.

Ascertaining the acceleration of the front wheel in more than just one spatial direction also increases the reliability and robustness of the method, since values and variables are available that allow a plausibility check and/or correction.

At least one acceleration sensor, in particular a multichannel acceleration sensor, is preferably used when ascertaining the acceleration of the front wheel in at least one spatial direction. When a multichannel acceleration sensor is used, a spatial direction is associated with each channel, so that the number of sensors can be reduced.

Alternatively or additionally, for ascertaining the acceleration of the front wheel in at least one spatial direction it is provided that a yaw rate of the front wheel is ascertained using the sensor system. The yaw rate of the front wheel is understood to mean the speed of rotation of the front wheel about the vertical axis. The yaw rate thus provides information concerning whether the rotational movement is quick and abrupt and a wheel flip can be deduced, or corresponds to a normal steering movement. A rotation rate sensor is preferably used for ascertaining the yaw rate.

If at least one acceleration sensor and one rotation rate sensor are used for carrying out the method according to the present invention, the measuring signals thus generated can be utilized for mutual plausibility checking. This does not preclude at least one further sensor from being present that generates further measuring signals. These signals can concern, for example, the wheel speed of the front wheel.

In addition, it is provided that the measuring signals generated using the sensor system of the two-wheeled vehicle are evaluated decentrally, for example directly in a sensor module. A separate evaluation unit can thus be dispensed with, so that the design complexity is reduced. The decentralized evaluation is suited in particular for comparatively simple and lightweight motorized two-wheeled vehicles such as E-bikes.

Alternatively, it is provided that the measuring signals generated using the sensor system are evaluated centrally in an evaluation unit or a control unit of the two-wheeled vehicle. For this purpose, the measuring signals are relayed from the sensor system to the evaluation unit or to the control unit, which requires a data-transmitting link of the sensor system to the evaluation unit or to the control unit. The central evaluation has an advantage that all measuring signals are combined centrally, and the evaluation can be made for numerous pieces of data, which at the same time can allow plausibility checking of the result. If necessary, protective measures can also be initiated and/or protective means can be activated directly via the evaluation unit or the control unit.

The measuring signals can be preprocessed, further processed as raw signals, or used as the basis for the evaluation, depending on the type of measuring signals and the sensor system that generates the measuring signals. The use of raw signals simplifies the method, but can result in inaccuracies.

In an example embodiment, it is provided that the measuring signals generated using the sensor system undergo preprocessing, for example by filtering and/or integration. Undesirable signal components can be masked by the preprocessing, so that the result of the subsequent evaluation is more accurate and thus more reliable.

For example, less relevant subareas of a spectrum can be masked by filtering, in particular by low pass, high pass, and/or band pass filtering of the generated measuring signals.

Alternatively or additionally, the measuring signals generated using the sensor system can be integrated over a predefined time window, for example to ascertain, based on an acceleration value, whether the speed is increasing or decreasing. With multiple integration, in addition to the change in speed "dv" (1st integral) it is also possible to detect a change in path "ds" (2nd integral).

Whether, and in what manner, the measuring signals are preprocessed depends in particular on the type of measuring signals and the sensor that generates the measuring signals. In addition, during application of the method to a specific two-wheeled vehicle, the type of signal preprocessing can be adapted to the particular requirements.

Furthermore, it is provided that changes in signals are detected via a time correlation of the measuring signals generated using the sensor system. Accordingly, the signal pattern over time, which can provide information concerning whether the front wheel is undergoing a rotation that differs from a normal steering movement, is very important.

To arrive at an appropriate evaluation, the measuring signals generated using the sensor system and/or the detected changes in signals are preferably compared to at least one predefined threshold value. If the value is above or below this threshold value, preferably within a preset time interval, this allows concrete inferences to be drawn. Since the threshold value can be a function of various factors, such as the type of two-wheeled vehicle, it is provided that the threshold value is adapted as a function of the application.

When carrying out the method according to the present invention, different sensors can be used, preferably sensors that are used to ascertain a linear acceleration and/or a yaw rate of the front wheel. In addition, it can be meaningful to also generate measuring signals that characterize the state of the front wheel, for example to carry out a plausibility check. As a refining measure, it is therefore provided that a deceleration of the front wheel in at least one spatial direction, preferably in the longitudinal direction, and/or a speed of the front wheel are/is ascertained using at least one further sensor. A quick, abrupt deceleration in the longitudinal direction and/or a quick, abrupt change in the wheel speed can likewise indicate a collision of the two-wheeled vehicle with another object. The wheel speed can also be used for ascertaining the speed of the motorized two-wheeled vehicle prior to the collision, and can thus provide information concerning the severity of the accident. In addition, a system that carries out the provided method can be activated via a preset speed limiting value.

Analogously to the collision recognition for passenger vehicles, a sensor cluster, whose measuring signals likewise allow plausibility checking, can also be provided in the area of a center of gravity of the motorized two-wheeled vehicle. The evaluation of the additional measuring signals can be carried out according to a standard method from the field of collision recognition.

If a collision of the motorized two-wheeled vehicle with another object is recognized, preferably at least one protective means, for example an airbag, is activated and/or at least one emergency measure, for example placing an emergency call, is initiated. The harmful consequences of the collision for the rider and/or other involved persons can be alleviated by appropriate measures. In addition, rapid rescue can be ensured. Thus, in some circumstances the advantages of the provided method do not benefit solely the rider of the motorized two-wheeled vehicle.

For achieving the object mentioned at the outset, in an example embodiment, a computer program including a program code is also provided which carries out the method according to the present invention when the computer program runs on a control unit of a motorized two-wheeled vehicle, in particular a motorcycle. For this purpose, the computer program is stored on a memory of the control unit or on an external memory medium that can be read by the control unit.

An example embodiment of the present invention is explained in greater detail below with reference to the appended drawings.

DETAILED DESCRIPTION

Figure 1:
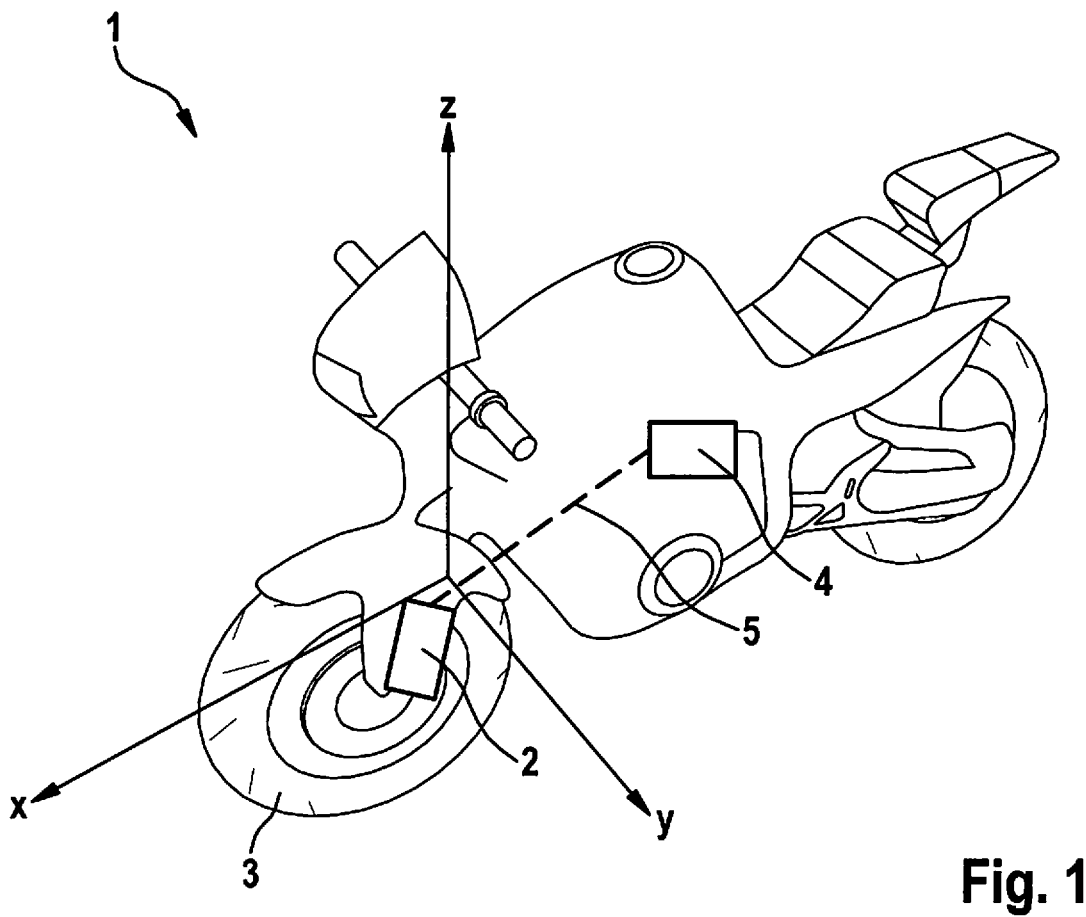
FIG. 1 shows a perspective illustration of a motorized two-wheeled vehicle for carrying out a method according to an example embodiment of the present invention.

FIG. 1 shows a motorized two-wheeled vehicle 1, in particular a motorcycle that is equipped with a sensor system 2 for accident recognition. Sensor system 2 is situated in the area of a front wheel 3 of the motorcycle and is connected to a control unit 4 via a data-transmitting link 5. The data transmission can take place wirelessly or via a data line. Two-wheeled vehicle 1 illustrated in FIG. 1 is suitable for carrying out a method according to an example embodiment of the present invention.

FIG. 1 also illustrates a coordinate system that is used to define the three mutually orthogonal spatial directions x, y, z. Spatial direction x denotes the longitudinal direction, spatial direction y denotes the transverse direction, and spatial direction z denotes the vertical direction. When the motorcycle is traveling forward, it experiences an acceleration in the longitudinal direction (spatial direction x). In the present case, the acceleration is detected by sensor system 2 situated at front wheel 3. The acceleration of front wheel 3 in the transverse direction and the vertical direction is detected at the same time. The function of sensor system 2 is to recognize a rotation of front wheel 3 that differs from a normal steering movement, which indicates a collision of two-wheeled vehicle 1 with another object. Since front wheel 3 is rotated quickly and abruptly during a collision, a corresponding process can be detected via measuring signals concerning the linear acceleration of front wheel 3 in at least one spatial direction x, y, z, preferably in the longitudinal and the transverse directions. These measuring signals are referred to below as signal Sx and signal Sy, depending on which spatial direction they relate to.

Figure 2:
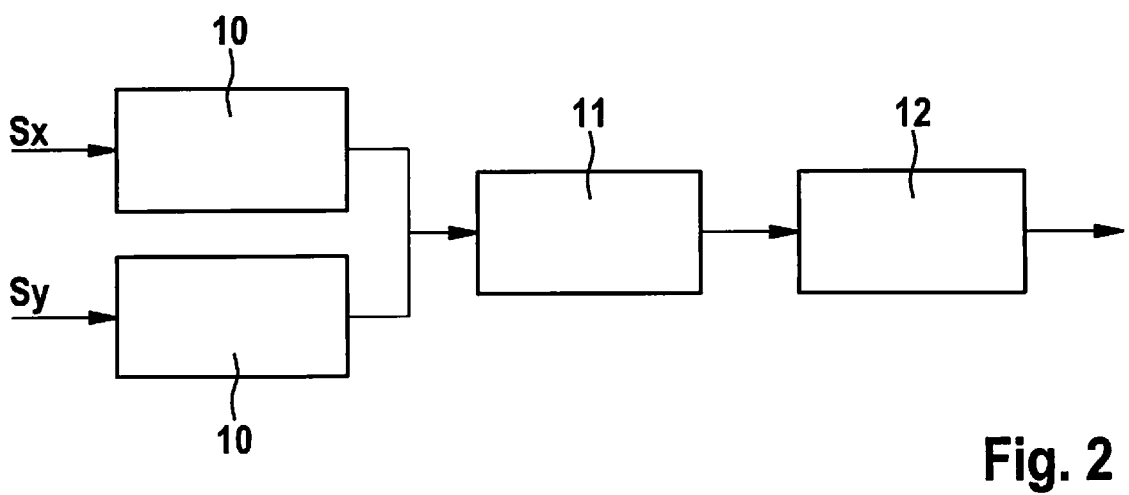
FIG. 2 is a flowchart illustrating the method according to an example embodiment of the present invention.

As is apparent in the block diagram of FIG. 2, signals Sx and Sy generated using sensor system 2 initially undergo a feature extraction 10, in particular using values that exceed and/or fall below a threshold value within preset time intervals. Feature extraction 10 is used to detect changes in signals that define individual events.

A time correlation 11 of all individual events is subsequently carried out, for example via a timer query with signal threshold value comparison.

Final assessment 12 is then made in a further method step, in particular by logical combination or use of a combinational logic system that is preferably stored in control unit 4. The result of the assessment can be the detection of a collision, for example.

Figure 3:
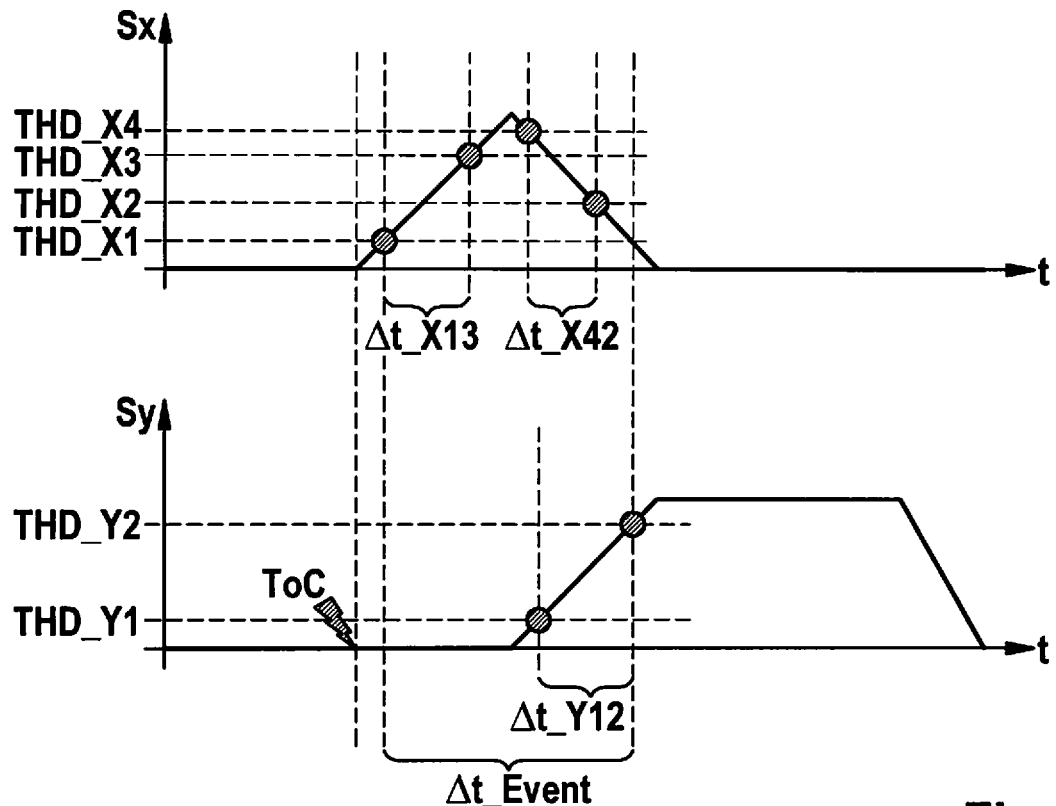
FIG. 3 is a schematic illustration of characteristic signal-time curves according to an example embodiment of the present invention.

A signal-time curve that is characteristic in the event of a collision, in particular separately for signals Sx and Sy, is apparent from FIG. 3 by way of example. Indication "ToC" marks the point in time of collision, which can possibly be subsequently ascertained. By comparing with predefined threshold values within preset time intervals, deviations can be recognized that indicate a "wheel flip" situation.

Figure 4:
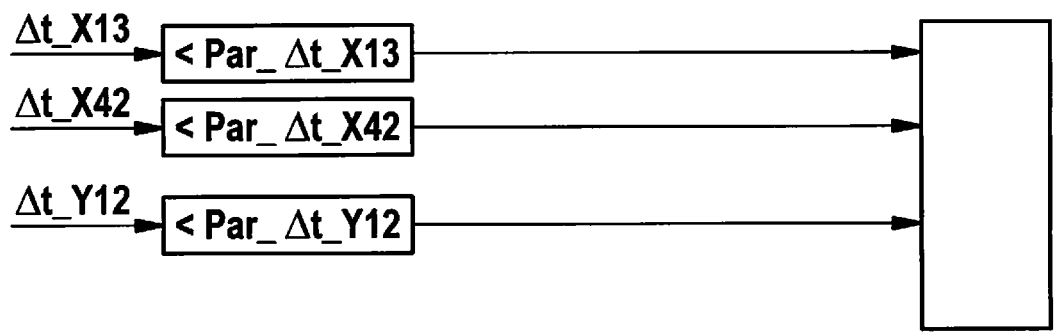
FIG. 4 is a diagram illustrating an algorithm for carrying out the method according to an example embodiment of the present invention.

FIG. 4 illustrates by way of example one possible characteristic form of an algorithm for "wheel flip" recognition, in particular based on the values taken from FIG. 3.

What is claimed is:

1. A method for a motorized two-wheeled vehicle that includes a sensor system, the method comprising:
    the sensor system generating one or more signals indicating a respective value of at least one rotation characteristic of a front wheel of the two-wheeled vehicle, wherein the at least one characteristic includes a yaw rate of the front wheel, an acceleration of the front wheel in at least one direction, and/or a deceleration of the front wheel in the at least one direction;
    for each of the one or more respective values as indicated by the one or more signals, determining, in a first determining step, that the respective value or a representation of the respective value is greater than a respective predefined threshold; and
    responsive to the determination, determining, in a second determining step, occurrence of a collision of the two-wheeled vehicle with another object.

2. The method of claim 1, wherein the two-wheeled vehicle is a motorcycle.

3. The method of claim 1, wherein the sensor system includes an acceleration sensor that detects, for the generation of at least one of the one or more signals, the acceleration of the front wheel in the at least one direction.

4. The method of claim 3, wherein the acceleration sensor is a multichannel acceleration sensor.

5. The method of claim 1, wherein the sensor system detects, for the generation of at least one of the one or more signals, the yaw rate of the front wheel.

6. The method of claim 1, wherein the sensor system includes a rotation rate sensor that detects, for the generation of at least one of the one or more signals, the yaw rate of the front wheel.

7. The method of claim 1, wherein the one or more signals are evaluated in an evaluation unit of the sensor system.

8. The method of claim 1, wherein the one or more signals are centrally evaluated in a control unit of the two-wheeled vehicle that is separate from the sensor system.

9. The method of claim 1, wherein the one or more signals are processed as one or more raw signals for the determination of the occurrence.

10. The method of claim 1, further comprising preprocessing the one or more signals to mask undesirable signal components, wherein the determination is made using the preprocessed one or more signals.

11. The method of claim 10, wherein the preprocessing includes filtering.

12. The method of claim 10, wherein the preprocessing includes integrating.

13. The method of claim 1, further comprising performing a time correlation of the one or more signals over time, and identifying a change in the one or more signals based on the time correlation, wherein the determination is based on the identified change.

14. The method of claim 13, wherein the representation of the respective value is determined to be greater than the respective predefined threshold value and the representation is the identified change.

15. The method of claim 14, wherein the threshold value differs for different two-wheeled vehicles.

16. The method of claim 1, wherein the at least one characteristic includes the deceleration of the front wheel.

17. The method of claim 16, wherein the at least one direction is a longitudinal direction of the vehicle.

18. The method of claim 1, wherein the at least one characteristic includes a speed of the front wheel.

19. The method of claim 1, further comprising, responsive to the determination of the occurrence of the collision, activating a protection device.

20. The method of claim 19, wherein the protection device is an airbag.

21. The method of claim 1, further comprising, responsive to the determination of the occurrence of the collision, activating an emergency measure.

22. The method of claim 21, wherein the emergency measure includes placing a call.

23. The method of claim 1, wherein the at least one characteristic includes the yaw rate of the front wheel, and the yaw rate or a change in the yaw rate is determined in the first determining step to be greater than the respective predefined threshold.

24. The method of claim 1, wherein the at least one characteristic includes the acceleration of the front wheel in at least one direction, and the acceleration or a change in the acceleration is determined in the first determining step to be greater than the respective predefined threshold.

25. The method of claim 1, wherein the at least one characteristic includes the deceleration of the front wheel, and the deceleration or a change in the deceleration is determined in the first determining step to be greater than the respective predefined threshold.

26. A non-transitory computer-readable medium on which are stored instructions (a) that are executable by a processor of a motorized two-wheeled vehicle that includes a sensor system and (b) that, when executed by the processor, cause the processor to perform a method, the method comprising:

obtaining from the sensor system one or more signals indicating a respective value of at least one rotation characteristic of a front wheel of the two-wheeled vehicle, wherein the at least one characteristic includes a yaw rate of the front wheel, an acceleration of the front wheel in at least one direction, and/or a deceleration of the front wheel in the at least one direction;

for each of the one or more respective values as indicated by the one or more signals, determining that the respective value or a representation of the respective value is greater than a respective predefined threshold; and responsive to the determination, determining occurrence of a collision of the two-wheeled vehicle with another object.

* * * * *